United States Patent [19]

Van Holten

[11] Patent Number: 4,530,644
[45] Date of Patent: Jul. 23, 1985

[54] DEVICE FOR DERIVING ENERGY FROM A FLOWING MEDIUM

[75] Inventor: Theodoor Van Holten, Pijnacker, Netherlands

[73] Assignee: Stichting Energieonderzoek Centrum Nederland, The Hague, Netherlands

[21] Appl. No.: 666,136

[22] Filed: Oct. 31, 1984

Related U.S. Application Data

[63] Continuation of Ser. No. 449,451, Dec. 13, 1982, abandoned.

[30] Foreign Application Priority Data

Dec. 17, 1981 [NL] Netherlands ............ 8105689

[51] Int. Cl.³ .................................. F03D 1/06
[52] U.S. Cl. ........................ 416/175; 416/236 A
[58] Field of Search ............ 416/175 AR, 191, 236 A

[56] References Cited

U.S. PATENT DOCUMENTS

| | | | |
|---|---|---|---|
| 4,093,402 | 6/1978 | Van Holten | 416/236 A |
| 4,130,378 | 12/1978 | Eichler | 416/236 A X |
| 4,247,252 | 1/1981 | Seki et al. | 416/175 A X |
| 4,329,115 | 5/1982 | Kress | 416/236 A X |
| 4,362,469 | 12/1982 | Van Holten | 416/191 |

FOREIGN PATENT DOCUMENTS 830627 2/1952 Fed. Rep. of Germany ... 416/175 A

Primary Examiner—Everette A. Powell, Jr.
Attorney, Agent, or Firm—Cushman, Darby & Cushman

[57] ABSTRACT

Each radially extending blade (12) of a wind motor is fitted near its tip with an auxiliary vane (13) which can result in an increase of efficiency. Different from known devices each auxiliary vane (13) is placed with respect to the blade (12) so that the low-pressure peaks of the vanes (13) and the blades (12) are separated one from the other rotation by more than 0.3-times the length of the largest chord. Preferably the auxiliary vanes (13) are designed so that its center of gravity lies in front of the blade (12). The lengthwise axis of the auxiliary vanes (13) makes an angle $\alpha$ lying between 10° and 40° with the rotational axis (11) of the blades (12), the lateral edges (17) of the vanes (13) is bevelled rearward with respect to the leading edge (16) under an angle $\beta$ from 15° to 45° and the surfaces meeting surfaces meeting at the lateral edges (17) make an angle Y which approaches zero value. The lines generating the underside of the vanes (13) are nearly straight. The imaginary extensions of the surfaces of adjacent vanes (13) as seen from the surface comprising the blades (12), at least contact each other.

10 Claims, 5 Drawing Figures

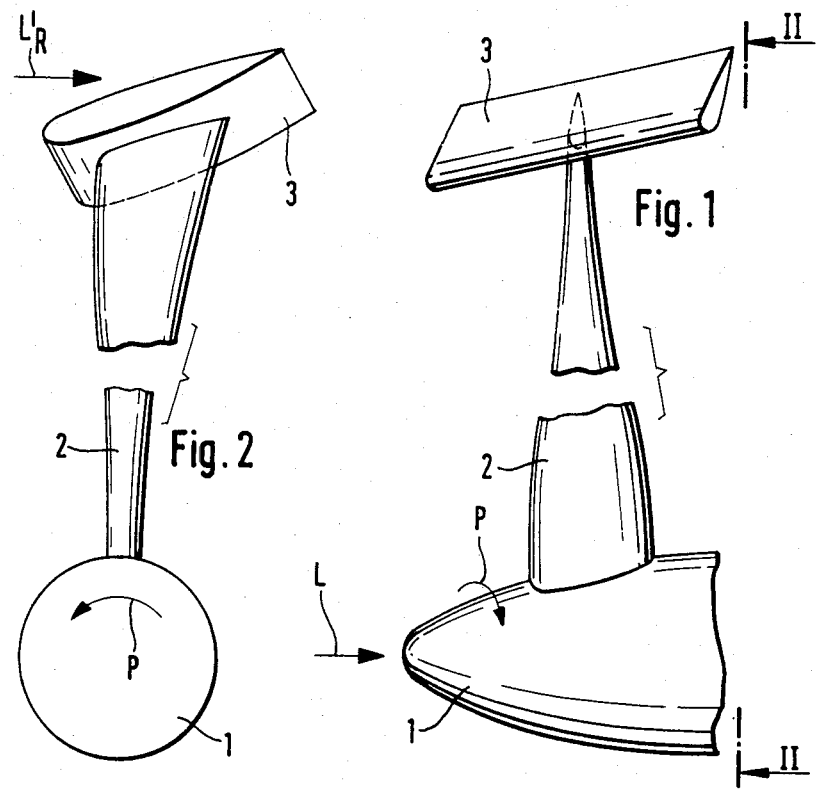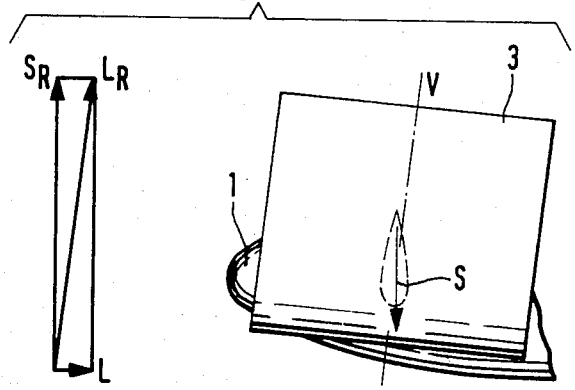

DEVICE FOR DERIVING ENERGY FROM A FLOWING MEDIUM

This is a continuation of application Ser. No. 449,451, filed Dec. 13, 1982, now abandoned.

The invention relates to a device for deriving energy from a flowing medium, such as a wind motor comprising in the main a hub rotatable about it axis with nearly radially extending blades attached to it, each of the blades being fitted at near its tip with an auxiliary vane which—seen in a sectional plane defined by the relative direction of flow during operation and the centerline of the blade—is positioned so that the chord of the auxiliary vane profile extended forward and lying in the afore-mentioned plane intersects a line which lies in this plane, runs nearly parallel to the relative direction of flow and passes through the rotational axis of the hub.

A device of this type is described in U.S. Pat. No. 4,093,402. The use of auxiliary vanes located at or near the tips of the blades results in the creation of a stationary annular vortex flow which can result in an increase of efficiency.

It appeared, however, that the increase in efficiency is not optimal if the auxiliary vanes are attached to the blades according to the design illustrated in FIG. 2 of the patent referred to above. With the disposition shown, the boundary layer of the auxiliary vane separates very easily and this leads sometimes to a considerable loss of energy. Moreover, the configuration shown can give rise to vibration problems (flutter) involving the possibility of blade breakage due to fatigue.

The object of the invention is to provide measures such that, with a given surface swept by the blades, an optimal amount of energy is derived from the flow of air and, moreover, vibration or flutter is suppressed.

This object is achieved by positioning the auxiliary vane with respect to the blade so that the low-pressure peaks of vane and blade are separated one from the other during rotation by more than 0.3 times the length of the largest chord.

Particularly expedient are the following measures which support each other:
a. Positioning of the auxiliary blade forward—as seen in the direction of rotation—with respect to the blade such that the low-pressure peaks of the vane and those of the blade are separated from each other (during rotation) by more than 0.3 times the length of the largest chord;
b. designing the auxiliary vane so that its center of gravity lies in front of the axis of elasticity of the blade; and
c. forming the blade in the vicinity of the hub so that the flowing medium does not separate from the hub.

The spacing (during rotation) between the low-pressure peaks is preferably chosen to lie in the order of magnitude of 0.5-times the length of the largest chord. This spacing will mostly equal the length of the chord of the auxiliary vane.

The low-pressure peak of the auxiliary vane is located approximately at the place where the vane is thickest, i.e., with a normal vane shaped like an airplane wing profile, relatively far to the fore. The same applies to the low-pressure peak of the blade. The arrangement according to the invention results in a positioning of the auxiliary vane relative to the blade which is by no means obvious from the constructional point of view. The placing of the auxiliary vane disproportionately far forward also meets the second requirement, i.e. the avoidance of vibration or flutter when the center of gravity of the auxiliary vane lies in front of the axis of elasticity of the blade. For this pupose it may be necessary to fit the auxiliary vane in some places with a material of higher weight.

Quite a different factor which can affect the operation of the wind motor in an unfavorable manner is the magnitude of the tilt angle of the auxiliary vane. With an incorrect angle, during rotation a flow is produced through the conical surface swept by the auxiliary vanes so that these act as propellers. This disadvantageous effect is avoided if the angle between the lateral axis of each auxiliary vane and the axis of the hub lies between 10° and 40°, preferably between 25° and 30°.

Another undesirable effect is the so-called edge suction effect. This arises as follows: the tip vortices which occur at the tips or edges (lateral edges) of the auxiliary vanes produce strong depressions at both edges (lateral edges). As the configuration of the vane-tip vortices is asymmetrical (in contrast to normal airplane wings), a residual net transverse force remains which has a component opposed to the direction of rotation.

The edge suction effect can be prevented or reduced by a suitable configuration of the auxiliary vanes on the upstream side. For this purpose the lateral edge is bevelled rearward relative to the leading edge under an angle of from 15° to 45°, preferably from 30° to 40°. Besides, to improve the efficiency this edge should be sharp and the two surfaces meeting there should form an angle approaching as far as possible zero value, while the longitudinal lines which generate the underside of the auxiliary vane facing the hub are practically straight.

The invention will be described with the aid of drawings in which:

FIG. 1 is a diagrammatic side view of a known device, only one blade being shown;

FIG. 2 is a rear view of the device along the line II—II of FIG. 1;

FIG. 3 is a plan view of the device according to FIG. 1, together with a velocity diagram;

Figure 4:
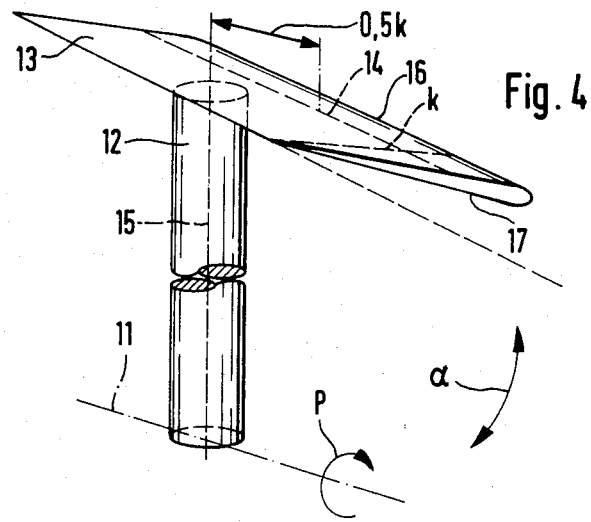
FIG. 4 is a perspective view of a blade with auxiliary vane according to the invention.

The known device illustrated here comprises a hub 1 with at least two blades 2 mounted on it, of which only one is shown in the drawing. When air flows toward the device from the left with a velocity L, as shown in FIG. 1, the hub will rotate in the direction of the arrow P. When the device rotates, the tip of the blade 2 will have a velocity indicated in FIG. 3 by S.

As shown in FIGS. 1 to 3, the tip of blade 2 is fitted with a rectangular auxiliary vane 3. As a result of the rotation of the blade 2, the auxiliary vane 3 will likewise have a circumferential velocity approximately equal to S. The relative air velocity caused by this rotation is indicated in the diagram of FIG. 3 by $S_R$; the relative velocity of air with respect to the auxiliary vane 3 will then be $L_R$. As $S_R$ is several times larger than L, the direction of $L_R$ will hardly vary even if the ratio $S_R : L$ will change. Th auxiliary blade 3, whose edge is approximately normal to the direction of $L_R$, will therefore nearly always be attacked in the same way.

It appears—in particular from FIG. 2—that the angle of attack of the auxiliary vane 3 with reference to the relative air velocity is such that the main component of the force acting on the auxiliary vane is directed toward the centerline of the hub 1. It is true that FIG. 2 shows a rear view on FIG. 1, but the plane in which this view lies makes only a very small angle with a view in the lengthwise direction of the vane, i.e. normal to the plane V shown in FIG. 3, running parallel to the direction of the relative air velocity and passing through the centerline of the blade 2. The component of the relative air velocity indicated in FIG. 2 by $L_R'$ makes therefore only very small angle with the direction of the actual relative air velocity.

The component parts shown in FIGS. 1, 2 and 3 are represented in FIG. 4 by corresponding reference numbers. The essential difference is that the auxiliary vane 13 is now positioned far more to the fore in the upstream direction relative to the blade 12, so that the distance between the low-pressure peaks, whose locus is indicated for the vane 13 by the dotted line 14 and for the blade 12 by the dotted line 15, amounts to about 0.5 k. In the present example, k is the length of the chord of the auxiliary vane 13, larger than that of the blade 12. FIG. 4 also shows that the lateral axis of the auxiliary vane makes an angle α (tilt angle) with the axis of rotation 11.

Figure 5:
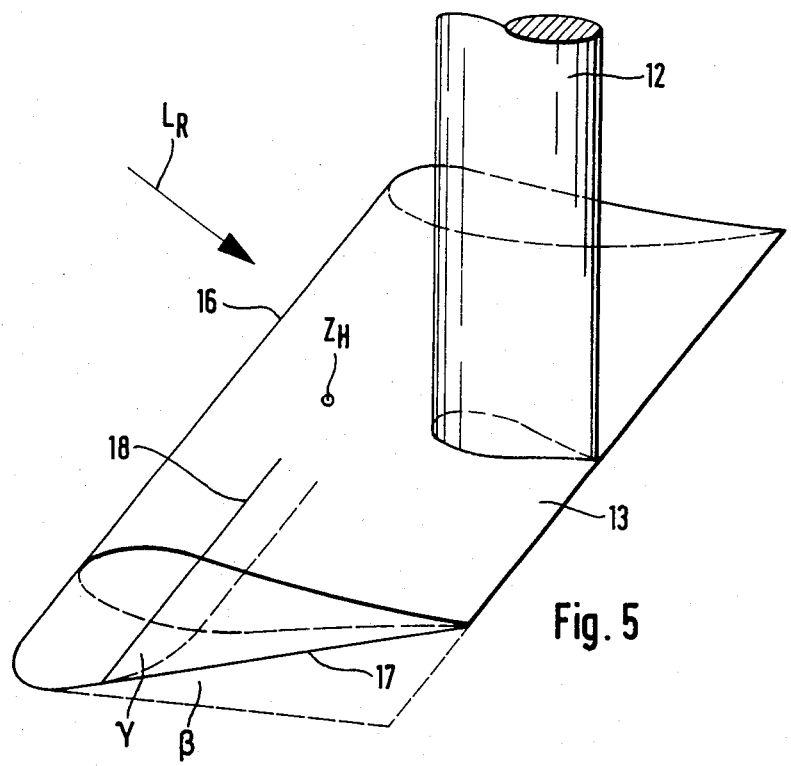
FIG. 5 is a more detailed view of the auxiliary vane and the blade.

FIG. 5 shows that the lateral upstream edge 17 is bevelled with respect to the leading edge 16 under an angle β and that the surfaces meeting at the edge 17 make one with respect to the other an angle γ which should as far as possible approach zero value, the lengthwise lines 18 which generate the underside of the vane facing the hub being nearly straight.

The auxiliary vanes disturb the normal flow pattern so that, to obtain optimal efficiency, the twist of the blades must be modified. Thus, the mounting, in accordance with the present invention, of auxiliary vanes on the blades of existing wind motors does not automatically result an optimal efficiency.

It should be noted that the imaginary extensions in the direction of relative flow of the surfaces of adjacent auxiliary vanes should—as seen from the surface comprising the blades—at least contact each other, but preferably partially overlap. This determines the shape of the auxiliary vanes.

The minimum magnitude of span of the auxiliary vanes is given by the formula:

$$b = \frac{U}{\Omega R} \cdot \frac{2\pi R}{N}$$

wherein:
b = span
U = wind velocity
Ω = angular velocity of rotor
R = radius of rotor
N = number of blades As shown in FIG. 5, the center of gravity $Z_H$ of the auxiliary vane 13 lies in front of the axis of elasticity of the blade 12.

It will be shown with the aid of an example that for a representative wind motor with auxiliary vanes designed according to design values to be set out below, for which the boundary layer separates from the auxiliary vane, the latter will not produce any additional power.

The coefficient of resistance of the auxiliary vane is measured in a wind tunnel.

This coefficient is defined as follows:

$$C_D = \frac{D_{aux.vane}}{\frac{1}{2}\rho(\Omega R)^2 S_{aux.vane}}$$

wherein:
$D_{aux.vane}$ = resistance of auxiliary vane
$\rho$ = density of air
$S_{aux.vane}$ = projected surface area of auxiliary vane
$\Omega$ = angular velocity of rotor
R = radius of rotor The increase of $C_D$ resulting from boundary layer separation can lie in the order of magnitude of $\Delta C_D = 0.10$. If no separation occurs (i.e. with the design according to the invention), $C_D$ is approximately zero.

The influence of this factor on the power of the wind follows from the expression $$\Delta C_P = \Delta C_D \cdot \sigma \cdot \lambda^3,$$

wherein:
$\Delta C_P$ = loss of power coefficient (the power coefficient being defined as:

$$C_p = \frac{P}{\frac{1}{2}\rho U^3 \pi R^2})$$

θ = solidity ratio of the vanes = total area of auxiliary vanes/frontal area of disk swept by blade, $\pi R^2$,
λ = angular velocity factor ("snellopendheid") = $\Omega R/U$
P = power of wind motor
U = wind velocity Thus, $\Delta C_P$ is zero when $\Delta C_D = 0$ (no boundary layer separation).

The effect of separation depends on many factors. The values for a representative design as referred to above are:

θ = 0.02
λ = 10
so that $\Delta C_P = 2$

With a conventional wind motor, $C_P$ is about 0.45. This means that the wind motor will not supply any power when boundary layer separation occurs, because $C_P = 0.45 - \Delta C_P$ will be negative.

For a wind motor without boundary layer separation, $C_P$ is about 1.0 to 1.1, $\Delta C_P$ being zero.

A second point relates to the improvement resulting from the special form of the edge 17 of the auxiliary vane. With an edge shaped as heretofore usual, $\Delta C_D$ is about 0.02 to 0.03, which means that $\Delta C_P$ is about 0.4 to 0.6. This also results in a less admissible loss of power.

I claim:

1. A device for deriving energy from a flowing medium, such as a wind motor comprising in the main a hub rotatable about its axis with nearly radially extending blades attached to it, each of the blades fitted at or near its tip with an auxiliary vane which, seen in a sectional plane defined by the relative direction of flow during operation and the centerline of the blade, is positioned so that the chord of the auxiliary vane profile extended forward and lying in said plane intersects a line which lies in said plane, runs nearly parallel to the relative direction of flow and passes through the axis of rotation of the hub, characterized in that the auxiliary vane (13) is placed with respect to the blade so that the low-pressure peaks of vane (13) and blade (12) are separated one from the other during rotation by more than 0.3-times the length of the largest chord.

2. A device according to claim 1, characterized in that:
(a) the auxiliary vane (13) seen in the direction of rotation is positioned forward with respect to the blade (12) in such a manner that the low-pressure peaks of the vane and of the blade are separated one from the other (during rotation) by more than 0.3-times the length of the largest chord;
(b) the auxiliary vane (13) is designed so that its center of gravity lies in front of the blade (12); and
(c) the blade (12) is shaped in the vicinity of the hub (1) in such a manner that the flow of air does not separate from the hub (1).

3. A device according to claim 1, characterized in that the distance between the low-pressure peaks is selected to lie (during rotation) in the order of magnitude of 0.5-times the length of the largest chord.

4. A device according to claim 1, characterized in that the lengthwise axis of each of the auxiliary vanes (13) makes an angle lying between 10° and 40° (angle $\alpha$) with the rotational axis (11) of the hub (1).

5. A device according to claim 1, characterized in that the angle between the lengthwise axis of the auxiliary vane (13) and the rotational axis (11) of the hub (1) lies between 25° and 30°.

6. A device according to claim 1, characterized in that the lateral edge (17) of the auxiliary vane (13) is bevelled rearward with respect to the leading edge (16) under an angle from 15° to 45° (angle $\beta$).

7. A device according to claim 6, characterized in that the lateral edge (17) is bevelled under an angle from 30° to 40°.

8. A device according to claim 6, characterized in that said lateral edge (17) is bevelled so that the surfaces meeting at this edge (17) make one with respect to the other and angle $\gamma$ which as far as possible approaches zero value, while the lines (18) generating the underside of the auxiliary vane (13) are nearly straight.

9. A device according to claim 1, characterized in that the imaginary extensions of the surfaces of adjacent auxiliary vanes (13), as seen from the surface comprising the blades (12), at least contact each other.

10. A device for deriving mechanical energy from a flowing fluid medium comprising: a hub rotatable about its axis; generally radially extending blades carried by the hub, each blade during operation exhibiting a locus along its length of low pressure peaks; and an auxiliary vane carried at or near the tip of each radially extending blade, each vane being generally rectangular and wing-shaped and having a lengthwise axis, a leading edge, a trailing edge and a lateral upstream edge, said vane exhibiting during operation a locus of low pressure peaks located between said leading edge and said trailing edge and said vane, when viewed in a sectional plane defined by the relative direction of flow during operation and the centerline of the blade, being positioned so that the chord of the vane profile extended forward and lying in said plane intersects a line which lies in said plane, runs generally parallel to the relative direction of flow and passes through the axis of rotation of the hub, with the locus of the low pressure peaks of the vane being separated from the locus of low pressure peaks during roation by more than 0.3 times the length of the largest chord and with the center of gravity of said vane lying in front of said blade, the lengthwise axis of said vane making an angle of 10° to 40° with the hub axis, and said lateral upstream edge of said vane is bevelled rearwardly with respect to the leading edge at an angle of 30° to 40°.

* * * * *